3,421,955
DIESTERS OF N-NITRO-IMINO-BIS-CARBOXYLIC ACIDS, USEFUL AS ADDITIVES IN EXPLOSIVES OR PROPELLANTS

Martin Hauser, Stamford, Conn., assignor to American Cyanamid Company, Stamford, Conn., a corporation of Maine
No Drawing. Filed Feb. 23, 1967, Ser. No. 619,120
U.S. Cl. 149—19          7 Claims
Int. Cl. C06b 15/00

ABSTRACT OF THE DISCLOSURE

This invention relates to a new class of compounds having the formula (I) 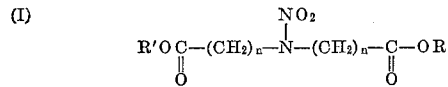

wherein R and R' are, individually, an alkyl radical, including substituted alkyl radicals, or a —$(CH_2)_m$—O—$(CH_2)_n$—OH radical and $m$ and $n$ are, individually, whole, positive integers of 1–9, inclusive. The compounds are liquids or low-melting solids which are stable up to about 150° and are useful in propellant or explosive composition when admixed with a fuel such as aluminum, magnesium, boron or carbon, a polymeric binder and various oxidizers.

BACKGROUND OF THE INVENTION

The instant invention relates to the art of rocket propellant compositions and explosives. The compounds claimed herein are diesters based on N-nitro-imino-bis-carboxylic acids which result when alcohols are reacted with such acids under the conditions described below.

My novel compounds are energetic by virtue of the fact that they contain nitro groups which also facilitate their usage in fuel compositions and explosives. They are believed to be the most economical and commercially attractive compounds for their intended use known at the present time and, as such, are not known in the prior art.

SUMMARY

My novel compounds, as mentioned above, contain nitro groups which cause them to be energetic and also enable them to solubilize nitro-containing polymers which are used as binders for explosives and propellant compositions. That is to say, my novel compounds function as plasticizers for known nitro-containing polymers such as nitropolyurethanes; nitropolyesters, etc. which, when cross-linked, are binders for rocket propellants. Since my compounds are energetic, as are the other ingredients of rocket propellants, i.e. the fuels, oxidizers, etc. they add their energy to that of the other components, in addition to being plasticizers, thereby resulting in ultimate propellants of even higher energetic capabilities.

DESCRIPTION OF THE INVENTION INCLUDING PREFERRED EMBODIMENTS

The compounds represented by Formula I, above, are produced by reacting an N-nitro-imino-bis-carboxylic acid with an alcohol according to the equation

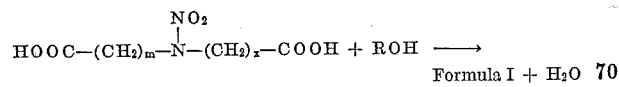

Formula I + $H_2O$

The reaction is conducted at the reflux (boiling) temperature of the specific compound which is utilized as the solvent for the charge materials. I have found that any aromatic compound which will azeotrope with water is useful for this purpose. Examples of representative solvents include benzene, toluene, xylene and the like.

The reaction is preferably conducted at atmospheric pressure although higher or lower pressures may be utilized if corresponding changes are made in the reaction temperature.

The reaction must be conducted in the presence of from about 0.1 to about 10.0%, by weight, preferably 3.0 to 6.0%, of a strong acidic material as a catalyst. The acid may be organic or inorganic with any of those materials known in the art being acceptable. Suitable catalysts include HCl, $HNO_3$, $H_2SO_4$, para-toluenesulfonic acid, $H_3PO_4$ and the like.

The reactants, i.e. the acid and the alcohol, are reacted in a molar ratio of 2/1 or greater of alcohol to acid.

The reaction should be run until the theoretical amount of water by-product is driven off. In this manner the purity of the final product is materially enhanced.

Examples of acids useful as charge materials in the reaction involved in producing the compounds of the instant invention include: N-nitro-2,2'-imino-bis-acetic acid, N-nitro-3,3'-imino-bis-propionic acid, N-nitro-4,4'-imino-bis-butyric acid, N-nitro-5,5'-imino-bis-valeric acid, N-nitro-6,6'-imino-bis-caproic acid, N-nitro-7,7'-imino-bis-enanthic acid, N-nitro-8,8'-imino-bis-caprylic acid, N - nitro-9,9'-imino-bis-pelargonic acid, 3-[N-(carboxymethyl)-N-nitroamino]propionic acid, 4-[-(2-carboxyethyl)-N-nitroamino]butyric acid, 6-[N-(3-carboxybutyl)-N-nitroamino] hexanoic acid, 9-[N-(carboxymethyl)-N-nitroamino]pelargonic acid mixtures thereof and the like.

Examples of suitable alcohols include methanol, ethanol, propanol, butanol, pentanol, hexanol, heptanol, octanol, nonanol, decanol, etc. the hydroxyl group being positioned on any carbon atom thereof; the glycols such as glycol, 1,2-propylene glycol, trimethylene glycol, tetramethylene glycol, pentamethylene glycol, hexamethylene glycol; glycerol; 1,2,3-trihydroxy butane; erythritol; dulcitol, etc. diethylene glycol; dipropylene glycol; dibutylene glycol; dinonylene glycol; mixtures thereof and the like.

As mentioned briefly above, the compounds of the instant invention are useful as plasticizers in rocket propellant compositions and explosives. As exemplary of this utility, one can prepare a propellant composition or expolsive by incorporating a fuel such as aluminum, magnesium, boron, carbon and the like, oxidizers such as the chromates, dichromates, permanganates, nitrates, chlorates and perchlorates of the alkali and alkaline earth metals such as sodium potassium, calcium; ammonia, hydrazine, guanidine, etc. in polymers such as polyesters, polyurethanes, etc. especially those which have been modified by chemically introducing nitro groups therein, see copending application, Ser. No. 619,119 filed concurrently herewith. Further discussion of propellant composition technology can be found in U.S. Patent Nos. 3,132,976, 3,132,978, 3,171,764 and 3,214,305, which patents are hereby incorporated herein by reference.

It has been also found that such propellant compositions may be prepared from solid fuels, carboxy-terminated binders, my novel compounds (with or without oxidizers) and various triaziridine cross-linking agents such as those set forth in copending applications, Ser. Nos. 605,146; 605,148 and 605,149, filed Dec. 23, 1966, and Ser. No. 574,936, filed Aug. 25, 1966.

The following examples are set forth for purposes of illustration only and are not to be construed as limitations on the instant invention except as set forth in the appended claims. All parts and percentages are by weight unless otherwise specified.

Example I

PREPARATION OF DIBUTYL-N-NITRO-3,3'-IMINO-BIS-PROPIONATE

To a suitable reaction vessel is added a mixture of 10.3 parts of N-nitro-3,3'-amino-bis-propionic acid, 16.3 parts of n-butanol, 0.5 part of p-toluenesulfonic acid and 75 parts of toluene. The mixture is refluxed for 5 hours while water, co-distilling with the toluene, is separated in a trap. The toluene and excess butyl alcohol are stripped in vacuo to give a yield of 95% of a clear, viscous liquid identified as dibutyl-N-nitro-3,3'-imino-bis-propionate.

Examples II–XI

Following the procedure of Example I, various other mixtures of acids, alcohols, solvents and catalysts were refluxed to produce novel diesters according to the instant invention. These mixtures are set forth hereinbelow.

(1) N - nitro - 2,2' - imino - bis - acetic acid; methanol; benzene; hydrochloric acid.

(2) N - nitro - 9,9' - imino - bis - pelargonic acid; ethanol; toluene; p-toluene sulfonic acid.

(3) 3 - [N - (carboxymethyl) - N - nitroamino] propionic acid; n-decanol; toluene; nitric acid.

(4) N - nitro - 3,3' - imino - bis - propionic acid; glycol; xylene; sulfuric acid.

(5) N - nitro - 3,3' - imino - bis - propionic acid; diethylene glycol; toluene; p-toluenesulfonic acid.

(6) N - nitro - 4,4' - imino - bis - butyric acid; dinonylene glycol; toluene; hydrochloric acid.

(7) 4 - [N - (2 - carboxyethyl) - N - nitroamino] butyric acid; mixture of methanol and ethanol; toluene; p-toluenesulfonic acid.

(8) N - nitro - 8,8' - imino - bis - caprylic acid; mixture of ethylene glycol and glycol; benzene; sulfuric acid.

(9) N - nitro - 3,3' - imino - bis - propionic acid; hexamethylene glycol; toluene; nitric acid.

(10) N - nitro - 3,3' - imino - bis - propionic acid; 1,2,3-trihydroxybutane; toluene; p-toluenesulfonic acid.

(11) N - nitro - 3,3' - imino - bis - propionic acid; methylene-ethylene glycol; toluene; p-toluenesulfonic acid.

The diesters of Examples I–IV were each utilized to prepare a rocket propellant composition wherein the fuel was aluminum powder, the oxidizer was ammonium perchlorate, the polymer was a carboxy-terminated nitropolyester and the cross-linker was 1,3,5-hexahydroaziridinyl-s-triazine. In each instance, a satisfactory high energy composition was produced. Similar compositions are useful as explosives.

I claim:

1. A compound having the formula

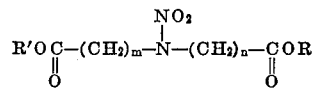

wherein R and R' are individually selected from the group consisting of an alkyl radical and a

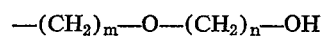

radical and $m$ and $n$ are whole, positive integers of 1–9, inclusive.

2. A composition according to claim 1 wherein R and R' are alkyl radicals.

3. A composition according to claim 1 wherein R and R' are $-(CH_2)_m-O-(CH_2)_n-OH$ radicals.

4. A composition according to claim 1 wherein R and R' are n-butyl radicals and $n$ and $m$ are 3.

5. A rocket propellant composition or explosive comprising a fuel selected from the group consisting of aluminum, magnesium, boron and carbon, a polymeric binder selected from the group consisting of polyester resins and polyurethane resins, an oxidizer selected from the group consisting of ammonia, hydrazine, guanidine and alkali metal or alkaline earth metal chromates, dichromates, permanganates, nitrates, chlorates and perchlorates and a compound of claim 1.

6. A composition according to claim 5 wherein the polymeric binder is a nitro group-containing polymer.

7. A composition according to claim 5 containing an aziridine cross-linking agent.

References Cited

UNITED STATES PATENTS 2,978,498  4/1961  Frankel et al. _____ 149—92 XR
3,248,420  4/1966  Linden _____ 149—92 XR LELAND A. SEBASTIAN, *Primary Examiner.*

U.S. Cl. X.R.

260—482; 149—20, 22, 36, 38, 44, 62, 75, 78, 92